United States Patent
Chin et al.

(10) Patent No.: US 9,498,710 B2
(45) Date of Patent: Nov. 22, 2016

(54) 3D FEEDBACK MOUSE SENSOR

(71) Applicant: PixArt Imaging Inc., Hsin-Chu (TW)

(72) Inventors: Kian Ming Chin, Hsin-Chu (TW); Yik Leong Chong, Hsin-Chu (TW)

(73) Assignee: PixArt Imaging Inc., Hsin-Chu (TW)

(*) Notice: Subject to any disclaimer, the term of this patent is extended or adjusted under 35 U.S.C. 154(b) by 233 days.

(21) Appl. No.: 14/076,285

(22) Filed: Nov. 11, 2013

(65) Prior Publication Data
US 2015/0133212 A1   May 14, 2015

(51) Int. Cl.
| | |
|---|---|
| *A63F 13/285* | (2014.01) |
| *G06F 3/0354* | (2013.01) |
| *G06F 3/01* | (2006.01) |
| *A63F 13/211* | (2014.01) |
| *G06F 3/038* | (2013.01) |

(52) U.S. Cl.
CPC ............ *A63F 13/285* (2014.09); *A63F 13/211* (2014.09); *G06F 3/016* (2013.01); *G06F 3/0383* (2013.01); *G06F 3/03543* (2013.01)

(58) Field of Classification Search
CPC ...................................................... A63F 13/06
See application file for complete search history.

(56) References Cited

U.S. PATENT DOCUMENTS

| | | | |
|---|---|---|---|
| 5,691,898 A * | 11/1997 | Rosenberg | A63F 13/06 345/161 |
| 6,211,861 B1 * | 4/2001 | Rosenberg | A63F 13/06 345/163 |
| 6,411,280 B1 * | 6/2002 | Aarts | A63F 13/06 345/156 |
| 2002/0021283 A1 * | 2/2002 | Rosenberg | A63F 13/10 345/156 |
| 2006/0255683 A1 * | 11/2006 | Suzuki | G05G 1/10 310/317 |

* cited by examiner

*Primary Examiner* — Omkar Deodhar
(74) *Attorney, Agent, or Firm* — Winston Hsu; Scott Margo

(57) ABSTRACT

A method for providing feedback from a personal computer (PC) to a mouse includes: providing a sensor within the mouse; utilizing the sensor to receive signals from the PC; defining a plurality of areas on the mouse which can provide a feedback response; and translating the signals from the PC to activate a feedback response of at least one of the plurality of areas.

10 Claims, 1 Drawing Sheet

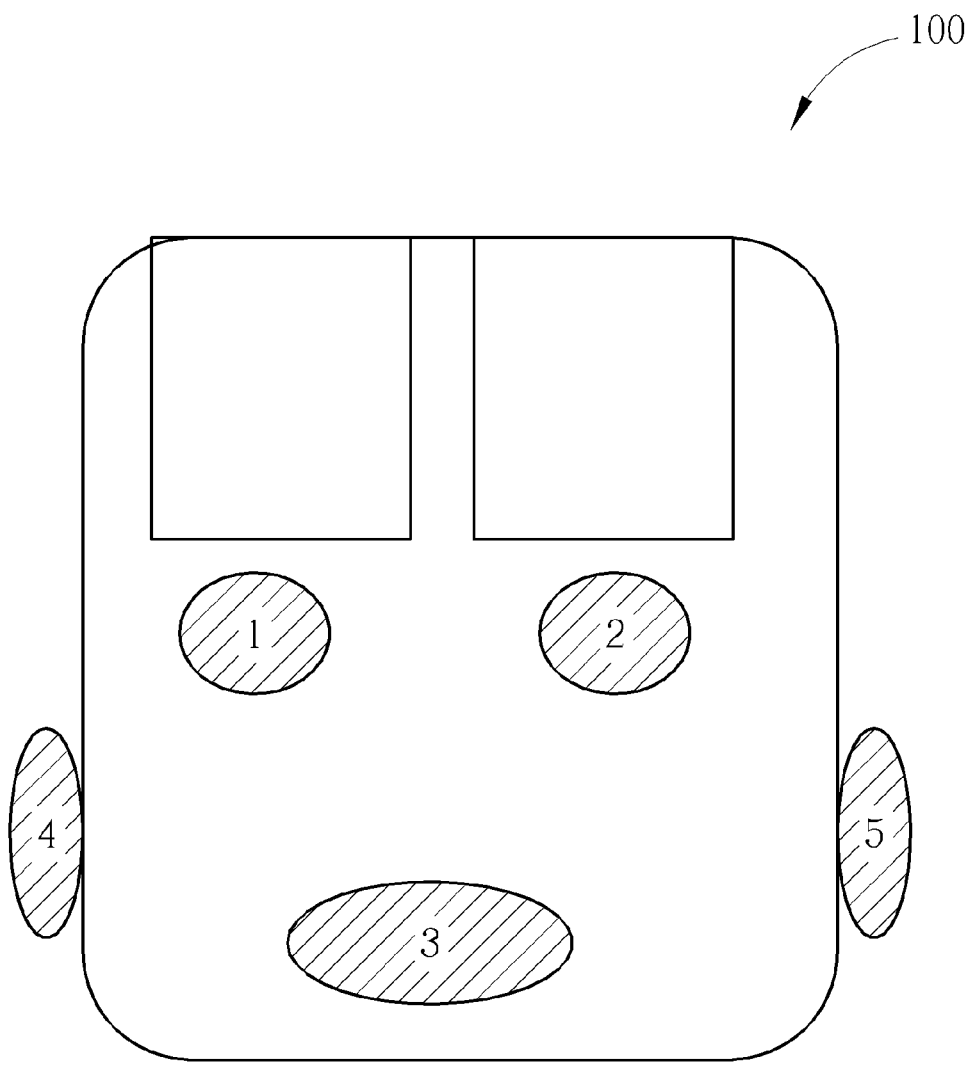

3D FEEDBACK MOUSE SENSOR

BACKGROUND OF THE INVENTION

1. Field of the Invention

This invention relates to a handheld mouse, and more particularly, to a handheld mouse which can provide feedback between the mouse and a personal computer (PC) for which the mouse is an input device.

2. Description of the Prior Art

Recent improvements in technology have enabled development in various fields such as hi-tech security systems, transport and industrial applications, but have also been put to use for entertainment purposes. Computer games are a popular pastime for many different kinds of people, and range from computerized versions of classic games for one person such as Solitaire to games which can be played between large groups of people in different locations all over the planet, such as 'World of Warcraft'.

With such a wide variety of computer games available to the public, game developers need to find an edge to differentiate their product from what else is available on the market. Improvements in image and sound quality are a particularly strong selling point, as modern computer games can thereby more closely emulate a real world environment.

When playing computer games using a gaming mouse, the user controls action within the game by moving the mouse accordingly. Popular first-person games such as 'Counter strike' and 'Grand theft auto' are displayed from the perspective of the user, to give the feeling that the user is actually within the world represented on screen. Although the above-mentioned improvements in graphics and sound have gone a long way to increasing the realism, the user experience is still limited to some degree by a lack of tactile sensation.

SUMMARY OF THE INVENTION

With this in mind, the present invention aims to provide a gaming mouse which can enable feedback between a personal computer (PC) and the mouse.

A method for providing feedback from a personal computer (PC) to a mouse comprises: providing a sensor within the mouse; utilizing the sensor to receive signals from the PC; defining a plurality of areas on the mouse which can provide a feedback response; and translating the signals from the PC to activate a feedback response of at least one of the plurality of areas.

A mouse for receiving feedback from a personal computer (PC) comprises: a plurality of areas for providing a feedback response; and a first sensor feature, for receiving signals from the PC, and translating the signals to activate a feedback response of at least one of the plurality of areas. The mouse further comprises a second sensor feature which can determine movement of the mouse to directly activate a feedback response of at least one of the plurality of areas back to the PC side.

A method of utilizing a mouse to provide feedback to a personal computer (PC) comprises: providing a sensor within the mouse; utilizing the sensor to collect information according to certain parameters of the mouse; translating the collected information into a command; and transmitting the command to the PC. The step of collecting the information comprises: collecting a predetermined number of samples over a predetermined period of time; and averaging the collected samples over the predetermined period of time;

A mouse for providing feedback to a personal computer (PC) comprises: a sensor, for collecting information according to certain parameters of the mouse; and a processor, coupled to the sensor, for translating the collected information into a command and transmitting the command to the PC.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE illustrates a mouse provided with various areas defined for providing feedback.

DETAILED DESCRIPTION

The present invention aims to provide a mouse that can provide haptic feedback to mimic certain movements and occurrences in a game to thereby improve the user experience. The invention works on the principle that certain features within the game will affect the user, and uses these features as input for the mouse, i.e. the PC will provide feedback to the mouse. For example, if the user is killed within the game, the movement of the mouse thereafter will not be able to affect what is displayed on the screen. The invention also uses the principle that, when gaming, motion of the mouse will affect what appears on the screen. For example, when a user moves the mouse to the left, the display will shift accordingly. This can be used to control certain actions within the game via the motion of the mouse, i.e. the mouse will provide feedback to a personal computer (PC) on which the computer game is displayed.

In order for the above to be achievable, the mouse needs to process real time information provided during the gaming session. The present invention provides a number of techniques for enabling this processing.

The gaming mouse of the present invention contains a mouse sensor. The mouse sensor is used for recording the motion of the mouse in order to provide feedback to the PC, and also for collecting information from the PC to provide haptic feedback to a user. The mouse sensor is primarily comprised of four new additional registers, in addition to the existing registers in a typical mouse sensor.

A first register reports the four major directions of the event occurring in the PC game and sends them to the mouse while the user is operating the mouse. The definition of the event could be an enemy attack from a certain direction or an alert from a certain direction. In general, the game needs to be designed in such a way that provides real time feedback to the sensor when needed. Eventually, these signals may translate the feedback into a vibration on the mouse casing or an LED lighting indicator as haptic feature to the user. A first proposed register 1 is provided below:

| Bit | 7 | 6 | 5 | 4 | 3 | 2 | 1 | 0 |
|---|---|---|---|---|---|---|---|---|
| Field | Down1 | Down0 | Up1 | Up0 | Right1 | Right0 | Left1 | Left0 |

Register type: bit form
Reset: 0x00
Access: Write/Read only
Data flow: PC to mouse The above register design comprises four major directions and default values are all set as 0 indicating no activity. An active direction triggered by the PC game will become 1, 2 or 3 depending on the intensity level for a certain period of time via an spi write with MCU in the mouse.

The first register in the mouse sensor is used to collect feedback from the PC, and provide a stimulus to the user, which may be in the form of vibration or flashing LEDs, for example. If certain panels are defined on the mouse, each panel can provide haptic feedback (for example) corresponding to a particular type of action which occurs within the game. Sample actions may include, but are not limited to, being attacked from the left, being attacked from the right, dying, and moving at different speeds. In the case of being attacked from the right, a right-hand panel on the mouse may vibrate in response for a period of time. Similarly, in response to being attacked from the left, a left-hand panel on the mouse may vibrate in response for a period of time. If a user dies in the game, the entire mouse may vibrate. In response to moving at different speeds, the mouse may vibrate at different frequencies corresponding to the different intensity level.

An example of an application haptic feedback with a vibrator via this new register is illustrated in the FIGURE, which illustrates a mouse 100 provided with areas 1, 2, 3, 4 and 5 which can provide haptic feedback to a user. Please note that the feedback areas could also be LED lights. The feedback points on the mouse correspond to certain activated bits in the register 1, and are mapped to the register bits via a look-up table (LUT) which is illustrated below.

| Vibrator point | Bit point to enable |
| --- | --- |
| Point 1 | Bit [5:4] and Bit [1:0] |
| Point 2 | Bit [5:4] and Bit [3:2] |
| Points 1 and 2 | Bit [5:4] |
| Point 3 | Bit [7:6] |
| Point 4 | Bit [1:0] |
| Point 5 | Bit [3:2] |
| Points 3 and 4 | Bit [1:0] and Bit [7:6] |
| Points 3 and 5 | Bit [3:2] and Bit [7:6] |
| Points 1, 2, 3, 4, 5 | Lifted mouse |

In the event of a base under attack from the left side of the game (a common occurrence in World of Warcraft III), a left signal will be sent to the sensor to trigger a set in Bit [1:0], so the vibrator point (4) will be activated for a certain period of time to warn the gamer, wherein the intensity level of vibration may be 1,2 or 3. The above information is based on angular motion, velocity and acceleration. These parameters are determined by the other three registers of the mouse.

The second register is an angular motion reporting between the PC and mouse or mouse and PC, and is illustrated below.

| Bit | 7 | 6 | 5 | 4 | 3 | 2 | 1 | 0 |
| --- | --- | --- | --- | --- | --- | --- | --- | --- |
| Field | Reserved | Reserved | Reserved | Reserved | 360° | 180° | 360° | 180° |

Register type: Byte
Reset: 0x00
Access: read only
Data flow: PC to Mouse/ Mouse to PC The rotational movement of the mouse can be measured by determining an angular change over a period of time, wherein the angle can be continuously acquired/calculated via extracting the existing X and Y motion reporting. For example, if the angle increases from 0 degrees to over 180 degrees over a certain period of time, it can be determined that the mouse has undergone a half rotation and Bit [0] is set for the PC side to read the information. If the angle increases from 0 degrees to 360 degrees and then changes back to 0 degrees, it can be determined that the mouse has undergone a full rotation and Bit [1] is set. Rotational information from the PC to the mouse can be stored via Bit [4] and Bit [3].

The third proposed register is the speed reporting register, which reports the current physical movement and speed of the mouse from the sensor and sends it to the PC game. The PC game needs to be designed to process the speed information collected from the mouse. The speed of the mouse movement could be determined by utilizing the existing parameters in the mouse sensor, i.e. the X and Y motion direction count. The third register is illustrated below.

| Bit | 7 | 6 | 5 | 4 | 3 | 2 | 1 | 0 |
| --- | --- | --- | --- | --- | --- | --- | --- | --- |
| Field | SP7 | SP6 | SP5 | SP4 | SP3 | SP2 | SP1 | SP0 |

Register type: Byte
Reset: 0x00
Access: read only

This register represents a speed indication where the minimum value is 0 and maximum is 255. An algorithm will be introduced to process the current speed movement with a gaming standard of inches per second (IPS).

X and Y vectors can be collected every predetermined time interval using a predetermined number of samples for obtaining an average direction. For example, all raw motion samples may be collected every 1 ms into the five most recent tab storage, and then a reported averaged velocity is determined. An algorithm can be used which is capable of storing the five most recent detected velocity measurements.

Example Application

An interactive kids' game has a colorful LED which points to the speed register placed on the top of the mouse casing in order to provide a blinking effect when the player moves the mouse. At the same time, the speed data (in inches/sec) could be sent to the game pc for an extra response in the game via this proposed special register.

The fourth proposed register is the acceleration reporting register, which reports the current acceleration physical movement of the mouse in the unit of IPS/s. This information is provided from the mouse to the PC game. The acceleration of the mouse movement could be determined by utilizing register 2.

Acceleration: (Final Velocity−Initial Velocity)/time

| Bit | 7 | 6 | 5 | 4 | 3 | 2 | 1 | 0 |
| --- | --- | --- | --- | --- | --- | --- | --- | --- |
| Field | AC7 | AC6 | AC 5 | AC 4 | AC 3 | AC 2 | AC 1 | AC 0 |

Register type: Byte
Reset: 0x00
Access: read only

The acceleration algorithm is similar to the velocity algorithm used in register 3, and is also capable of storing the five most recent collected acceleration values, wherein samples are taken every 1 ms.

All the above information can be translated into certain commands and is given as feedback to the PC. For example, a rotation of the mouse may correspond to shooting a gun in a first person shooter game. This function can also be extended to non-gaming applications; for example, a rotation of the mouse can be a shortcut to an often performed function, such as printing what is displayed on the PC screen. If, conventionally, a different command is used to perform this function, the particular mouse motion can be allowed to override the conventional command.

The above use of the first register enables information to be collected corresponding to a user controlled movement of the mouse from the gaming session, and this information is translated into various physical indicators which will be performed by the PC. In particular, the commands are used to perform various functions or actions related to a computer game displayed on the PC, such that feedback from the PC to the mouse will be used by the PC to affect certain parameters within the game.

In this way, a two-way mouse sensor system is provided. It should be noted that the above implementation is merely provided for explanatory purposes. The two-way feedback mouse can be utilized for many other applications; the use of the gaming mouse is merely a preferred embodiment. Further, the feedback response of the mouse is not limited to vibration and flashing LEDs; any appropriate response which can be sensed by the user (audio, for example), falls within the scope of translating signals from the PC into feedback response of the mouse.

The above system and method not only provides a more real-world experience when playing a computer game using the 3D feedback mouse of the present invention, but also enables a greater range of user input to the PC via the mouse when performing other applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for providing feedback from a personal computer (PC) to a mouse, the method comprising:
   providing a sensor within the mouse;
   utilizing the sensor to receive signals from the PC;
   providing a register coupled to the sensor, wherein the register comprises a plurality of bits, and specific signals received from the PC trigger specific bits of the plurality of bits;
   defining a plurality of areas on the mouse which can provide a feedback response, the plurality of areas corresponding to the plurality of bits in the register; and
   translating the signals from the PC to trigger specific bits within the register and thereby activate a feedback response of at least one of the plurality of areas.

2. The method of claim 1, wherein the plurality of areas are vibrating panels and the feedback response is a haptic response.

3. The method of claim 1, wherein the plurality of areas comprise a plurality of LEDs, respectively, and the feedback response comprises flashing of the LEDs.

4. The method of claim 1, wherein the plurality of areas respectively correspond to a plurality of directions, and the method further comprises:
   utilizing the PC to play a first person game;
   when a non-user controlled action occurs in the first person game, translating the signal from the PC to determine a direction of the non-user controlled action; and
   activating the feedback response of an area by triggering at least a specific bit within the register corresponding to the translated direction.

5. The method of claim 1, wherein movement of the mouse can be directly utilized to activate a feedback response of at least one of the plurality of areas.

6. A mouse for receiving feedback from a personal computer (PC), the mouse comprising:
   a plurality of areas for providing a feedback response;
   a register comprising a plurality of bits corresponding to the plurality of areas; and
   a first sensor, coupled to the register, for receiving signals from the PC, and translating the signals to trigger specific bits of the plurality of bits within the register to activate a feedback response of at least one of the plurality of areas.

7. The mouse of claim 6, wherein the plurality of areas are vibrating panels and the feedback response is a haptic response.

8. The mouse of claim 6, wherein the plurality of areas comprise a plurality of LEDs, respectively, and the feedback response comprises flashing of the LEDs.

9. The mouse of claim 6, wherein the plurality of areas respectively correspond to a plurality of directions, the PC is utilized to play a first person game, and when a non-user controlled action occurs in the first person game, the first sensor translates the signal from the PC to determine a direction of the non-user controlled action, and the feedback response of an area is activated by triggering at least a specific bit within the register corresponding to the translated direction.

10. The mouse of claim 6, wherein the mouse further comprises a second sensor which can determine movement of the mouse to directly activate a feedback response of at least one of the plurality of areas.

* * * * *